United States Patent

Simpson et al.

[11] 3,863,144
[45] Jan. 28, 1975

[54] HIGH SENSITIVITY GRADIENT MAGNETOMETER

[75] Inventors: James H. Simpson, Katonah; Donald S. Bayley, Bedford, both of N.Y.; Ivan A. Greenwood, Stamford, Conn.

[73] Assignee: The Singer Company, Little Falls, N.J.

[22] Filed: Oct. 17, 1973

[21] Appl. No.: 407,382

[52] U.S. Cl........... 324/0.5 R, 324/0.5 E, 324/0.5 F
[51] Int. Cl. ........................................... G01n 33/08
[58] Field of Search............ 324/0.5 R, 0.5 E, 0.5 F, 324/0.5 MA

[56] References Cited
UNITED STATES PATENTS

| | | | |
|---|---|---|---|
| 2,930,966 | 3/1960 | Bell ................................ | 324/0.5 R |
| 3,150,313 | 9/1964 | Dehmelt .......................... | 324/0.5 F |
| 3,158,803 | 11/1964 | Bell ................................ | 324/0.5 F |

OTHER PUBLICATIONS

D.E.P. Silver — A Differential Nuclear Magnetic Resonance Magnetometer — Electronic Engineering — 36(436)— June, 1964, pp. 374–377.

M. J. Aitken, M.S. Tite— A Gradient Magnetometer, Using Proton Free — Precession — Journal of Sci. Instr. — V. 32— 1969— pp. 625—629.

*Primary Examiner*—Michael J. Lynch
*Attorney, Agent, or Firm*—T. W. Kennedy

[57] ABSTRACT

A high sensitivity microgradient magnetometer in which two interconnected magnetic resonance spin generators on a common base are optically pumped by a first common beam and read out by a second common beam parallel to the $H_1$ coils used to sustain the oscillations in the cells thereby making the system insensitive to changes in direction of the earth's magnetic field.

17 Claims, 4 Drawing Figures

HIGH SENSITIVITY GRADIENT MAGNETOMETER

BACKGROUND OF THE INVENTION

The invention herein described was made in the course of or under a contract, or subcontract thereunder with the Department of the Navy.

This invention relates to gradient magnetometers in general, and more particularly to an improved high sensitivity gradient magnetometer which uses optically pumped magnetic resonance cells.

The potential for use of optical absorption magentometers is well recognized in the art. For example, see U.S. Pat. No. 3,629,964, granted to D. Pherarn on Dec. 21, 1971, and U.S. Pat. No. 3,158,803, granted to W. E. Bell on Nov. 24, 1964. Each of these patents discloses a magnetometer which operates on the principle of detecting the spin frequency in an optically pumped resonance cell. Each in a sense is also a differential type magnetometer. For a background in theory related to optically pumped resonance cells, see U.S. Pat. No. 3,214,683, granted to J. M. Andres on Oct. 26, 1965.

As is indicated in these references, there is a need for a high sensitivity magnetometer which may be used for airborne detection of magnetic anomalies, such as those produced by submarines; for use in airborne prospecting, such as locating geophysical structures associated with petroleum and mineral deposits; for ground based surveillance; and for biomedical applications. Although the prior art devices have to some extent been useful in some applications they have a number of drawbacks. In general, the desired amount of sensitivity has not been obtainable in these devices because of problems such as perturbations due to lamp shift, sensitivity to maneuvering errors, and temporary field fluctuations. The present invention provides a device which substantially overcomes these problems and therefore is capable of providing increased sensitivity.

The structure of the apparatus of the present invention is similar in some ways to the described in application Ser. No. 150,486 now U.S. Pat. No. 3,778,700 granted Dec. 11, 1973 to the inventors herein, which patent is hereby incorporated by reference.

SUMMARY OF THE INVENTION

In general, the present invention comprises two interconnected magnetic resonance spin generators on a common base and includes as elements two optically pumped resonance cells pumped by a common beam light source so that any perturbations caused by lamp shift will show up substantially identically at each cell. Since the device is of a differential type, such perturbations will not materially affect the final output. Similarly, a common lamp is used to provide two separate readout beams. Each readout beam is perpendicular to the respective pumping beam and is parallel to the respective $H_1$ coil which is used to sustain the gyro magnetic oscillations. By making this beam parallel to the $H_1$ field, the sensitivity of the device to changes in direction of the earth's magnetic field is reduced. To compensate for normal variations in the earth's field, bias coils are provided which have as an input a signal, derived from the phase difference between the two cell outputs, which will tend to null out the phase difference over long time periods.

DETAILED DESCRIPTION OF THE PREFERRED EMBODIMENT

Figure 1:
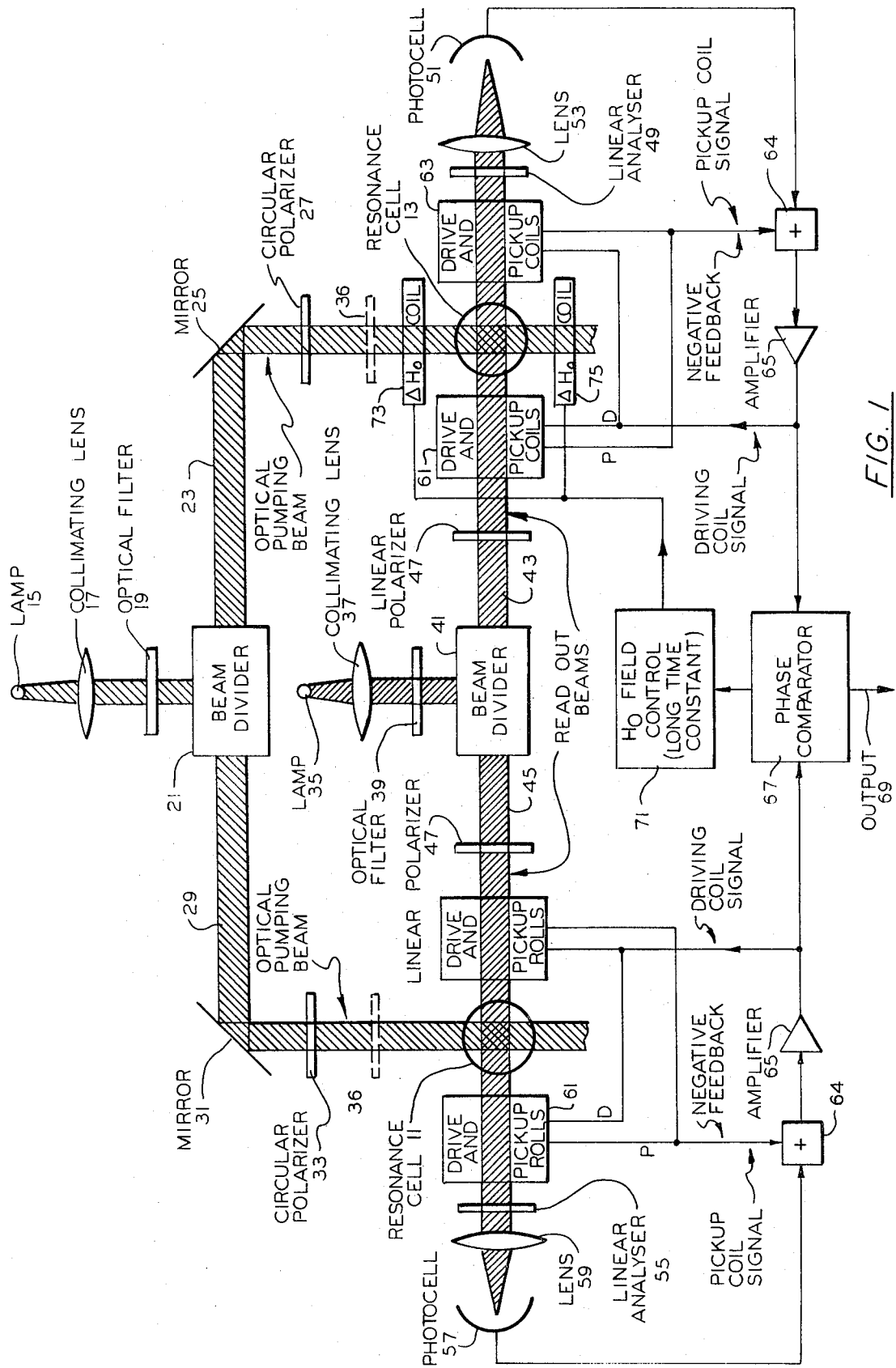
FIG. 1 is a schematic-block diagram of the preferred embodiment of the present invention.

In the embodiment shown in FIG. 1, two identical magnetic resonance cells are mounted a distance of one-tenth to three meters apart. A lamp 15 provides optically resonant radiation to the two cells 11 and 13 to optically pump them. Cells 11 and 13 and lamp 15 should preferably contain vapors of cesium or rubidium although other alkali metals or mercury may be used. To obtain the highest figure of merit possible, unbuffered resonant cells may be used. For example, mercury cells with uncoated walls may be used or, where alkali metals cells are employed, a parafin-like coating, for example fractionated paraflint, may coat the glass cell walls. The light from lamp 15 is first collimated by a lens 17 and then passed through a filter 19 which will allow only one component, for example the $D_1$ component of the radiation to pass. The filtered radiation is then passed through a beam divider 21 which splits the beam into two components. This beam divider may be of the type in which the light is linearly polarized in one direction coming out one side and perpendicular to this coming out the other side, e.g., the Brewster angle beam divider disclosed in application Ser. No. 150,486, now U.S. Pat. No. 3,778,700 granted Dec. 11, 1973. Output beam 23 is reflected from a mirror 25 and then passed through a quarter wave plate 27 where it is circularly polarized and directed to cell 13. The other beam 29 is similarly polarized after it is reflected by mirror 31 through a quarter wave plate 33 to cell 11. In aligning this optical system and the readout system to be described below, it is essential that care be taken that both cell 11 and cell 13 receive light from the same region of lamp 15 in order to minimize lamp shift differences between the two cells. By having the same region imaged on both cells, any intensity variations in lamp 15 will occur substantially identically at both cells. Since the system works on a differential principal, as regards lamp shifts, changes in the lamp intensity will not have any substantial affect on the final output. However, if different regions are imaged on the two cells 11 and 13, they may vary in a different manner and cause incorrect outputs. In addition, a variable attenuator 36 shown in dotted lines may be inserted in one or both of the beam paths for use in balancing intensity when calibrating the system. The radiation from lamp 15 will pump up the resonance cells in the well-known manner, as described in the references above. A second lamp 35 provides the readout beam for the two cells 11 and 13. As in the case of lamp 15, its radiation is first collimated by a lens 37 and it is then filtered by a filter 39 which transmits only the one spectral region of the radiation and may also provide a shift for enhancing the readout signal. A beam divider 41 similar to beam divider 21 divides the filtered output into two beams 43 and 45. Each of these beams 43 and 45 is then passed through a polarizer 47. Two types of polarization are possible in the readout. The light may be circularly polarized, in which case the output from the cell will be amplitude modulated without need for further operation upon it; or the light may be linearly polarized, in which case a linear analyzer is required at the output. The latter of these is preferable since the circularly polarized light will tend to cut down more on the efficiency of the pumping radiation. If beam divider 41 also provides the linear polarization, a reduction in hardware will result since the linear polarizer 47 may be eliminated. Beam 43 after linear polarization, is directed to cell 13, and after passing through that cell, goes through a linear analyzer 49 and is then imaged on a photocell 51 by a lens 53. This assumes linear polarization. If circular polarization is used, linear analyzer 49 will not be required, and a quarter wave plate before the cell will be required. Similarly, beam 45, after going through its linear polarizer 47, passes through cell 11, linear analyzer 55, and is imaged on photocell 57 by lens 59.

Each of the resonance cells 11 and 13 is placed between a pair of RF driving coils 61 and 63 which is oriented to be coaxial with its respective readout beam. This insures that phase shift in the spin generator loops will not be affected significantly by changes in the direction in the earth's magnetic field relative to the instrument.

Spin generator action is maintained in the two resonance cells 11 and 13 by using an amplified output respectively from photocells 57 and 51 to drive their respective RF coils 61 and 63 in a manner similar to that described in our aforementioned application. This is done by connecting each of the photocell outputs to an associated amplifier 65 which has its output connected to the coils 61 and 63. By having readout beams 43 and 45 parallel to the $H_1$ magnetic fields generated by coils 61 and 63, a 90° geometrical and frequency independent phase shift between the $H_1$ field and the output of photocells 57 and 51 is introduced. To compensate for this, a pair of pickup coils is included with each of drive coils 61 and 63 which is used along with the outputs of photocells 57 and 51 in the feedback path of amplifier 65, the signals being summed at summing points 64. These pickup coils may be wound on the same forms as the RF driving coils, and the resulting close magnetic coupling contributes to the ability of the circuit to minimize phase shifts caused by eddy currents induced in nearby conductors. Phase shifts introduced by the close capacitive coupling can be made very small by proper choice of the turns and resistance ratios of the two sets of coils.

In one embodiment, the outputs of amplifiers 63 and 65 are provided to a phase comparator 67 wherein their phase difference from quadrature is determined and an output signal proportional to this difference is accumulated over a preset observation time T. Phase comparator 67 provides the system output on line 69 which will be a function of the differential magnetic field sensed. An output of phase comparator 67 is also provided to a $H_o$ field control circuit 71 which provides its outputs to two $H_o$ coils 73 and 75 oriented basically in the same direction as the earth's magnetic field $H_E$ with respect to cell 13. The sensed phase difference from phase comparator 67 will be provided through field control 71 to these coils to tend to null out this difference and to provide a closed loop system. The signal from phase comparator 67 will be amplified and filtered by a suitable amplifier and smoothing circuit with a long time constant field control 71 to provide the required operation. The initial current in coils 73 and 75 can be adjusted to cancel the effects of any constant differences in the earth's magnetic field at the two cells 11 and 13.

Figure 2:
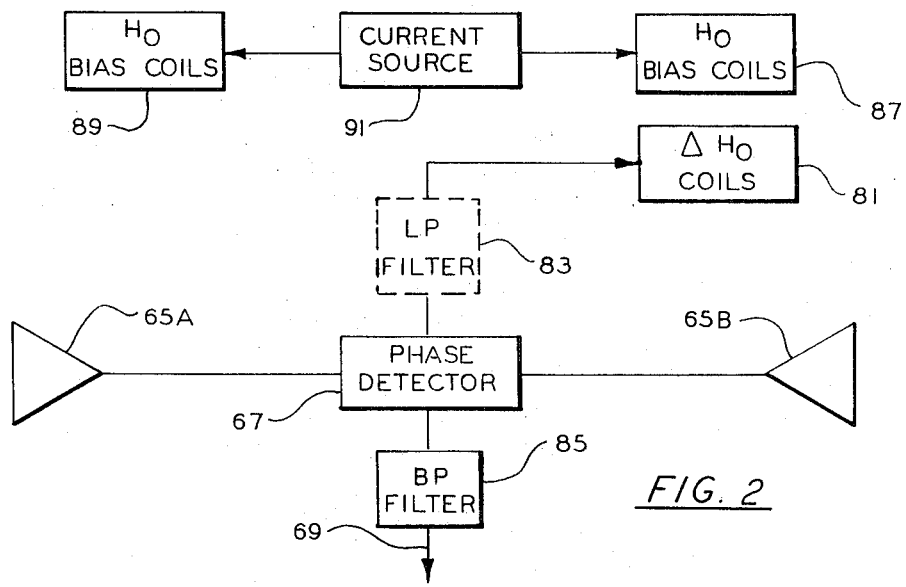
FIG. 2 is a block diagram illustrating a first output and feedback arrangement for use with the embodiment of FIG. 1.
Figure 3:
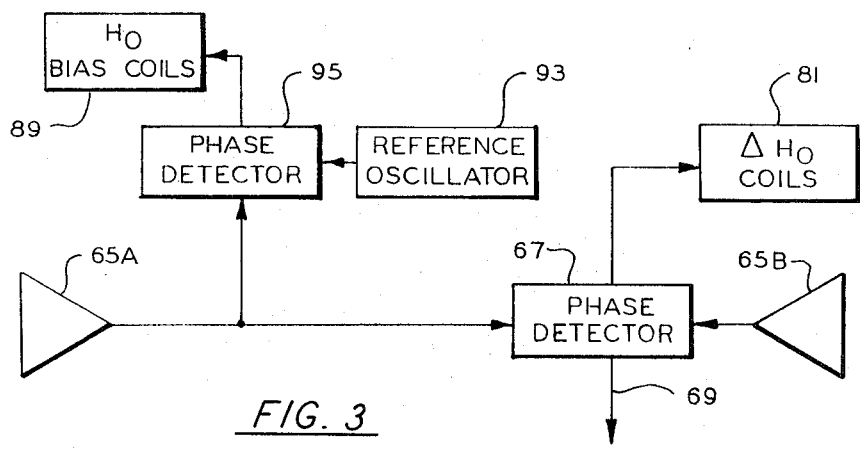
FIG. 3 is a block diagram illustrating a second output and feedback arrangement for use with the embodiment of FIG. 1.
Figure 4:
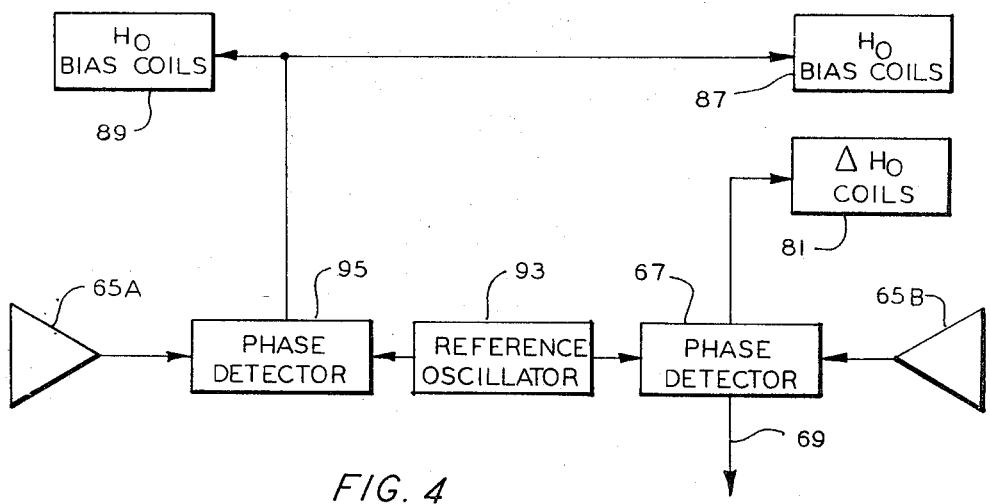
FIG. 4 is a block diagram illustrating a third output and feedback arrangement for use with the embodiment of FIG. 1.

FIGS. 2 to 4 illustrate various means of handling the signals output from amplifiers 65. The simplest system, shown in FIG. 2 corresponds to the system described in connection with FIG. 1 and comprises a phase detector or comparator 67 and a $\Delta H_o$ coil 81. Interposed between the phase detector 67 and the $\Delta H_o$ coil is an optional low pass filter 83 shown in dotted lines. Also optional but used in the same system which uses the filter 83 is a bandpass filter 85 in the output. In the embodiment with neither filter present, the signal representing the difference in magnetic fields which is output from phase comparator 67 will be provided both to the $\Delta H_o$ coils in a feedback loop and as the output signal. This signal will contain both high and low frequency changes. With filters 83 and 85 in the circuit, the signal from phase detector 67 will be broken down into its low frequency or long-term components and its high-frequency components. The low-frequency components will be passed through filter 83 to the $\Delta H_o$ coils to correct for long-term differences between the outputs of amplifiers 65A and 65B. The high-frequency components, which will indicate dynamic changes in a magnetic field as the magnetometer is moved over a particular area will be provided through the bandpass filter 85 to the output line 69.

Measurements may also be made with the $\Delta H_o$ feedback path open by including appropriate signal processing in the phase detector operation 67, so that the required frequency differences and phase excursions can be accomodated.

The frequencies at which the spin generators of FIG. 1 will resonate in the normal earth's field will be as given by the product of the magneto-gyric ratio of the resonance medium and the magnitude of the earth's field. For cesium, 200 kilohertz is typical. For ease of signal processing and in order to simplify hardware, it is sometimes helpful to reduce this frequency. Therefore, there may be added to the system $H_o$ bias coils 87 and 89 and a current source 91 to drive these coils. The coils will be arranged to generate magnetic fields which will oppose the earth's magnetic field, thereby reducing the magnitudes of the net magnetic fields at the spin generators. This in turn permits operating the spin generators at a lower frequency. Since both coils will be identical and will have the same current provided to them, the differential effect on the system will nominally be zero.

Another means of processing the signals from amplifiers 65A and 65B is shown in FIG. 3. In this embodiment a reference oscillator 93 and a second phase comparator 95 are added. Also, only one $H_o$ bias coil 89 is used. In operation the phase comparator 95 will compare the signal from amplifier 65A with that of the reference oscillator and will provide an output to bias coils 89 to cause the two frequencies to be equal thus causing the spin generator to operate at the lower desired frequency. This in turn will cause this frequency to be the input to comparator 67 and, when compared with the output of amplifier 65B therein, it will provide a current to the $\Delta H_o$ coils 81 to bring the other spin generator to that frequency. When a differential magnetic field is detected between the two spin generators, it will show up as before at the output of detector 67 on line 69. As before, filtering may be used if desired.

The embodiment of FIG. 3 uses the $\Delta H_o$ coils both as bias coils and to null out long-term differences between the two spin generators. FIG. 4 shows a system which offers the advantages of both the system of FIG. 3 and that of FIG. 2. In this embodiment the $H_o$ bias coils 89 and 87 are both controlled by the output of phase comparator 95. Thus, this output will cause a bias on each of these coils which will result in both spin generators operating at the desired frequency assuming there is no difference in magnetic field. The output of amplifier 65B is now compared with the output of reference oscillator 93 and frequency comparator 67. If no difference in the field exists these two frequencies will be equal because of the bias coils 87, and there will be no input to the $\Delta H_o$ coils 81. However, if a differential magnetic field occurs, the frequency output of amplifier 65B will change with respect to the reference oscillator and an output will be provided to the $\Delta H_o$ coils to correct for this. This same output is provided on line 69 and will indicate the difference in the magnetic field between the two spin generators. Although $\Delta H_o$ coils 81 have been indicated as being associated with only one resonance cell, it may sometimes be preferable to apply $\Delta H_o$ windings differentially to both resonance cells, both driven by the output of phase detector 67.

Thus, a microgradient magnetometer which uses a common pumping lamp and a common readout lamp to eliminate errors caused by lamp shift and which provides a number of useful output circuits has been shown. Although specific embodiments have been shown and described, it will be obvious to those skilled in the art that various modifications may be made without departing from the spirit of the invention which is intended to be limited solely by the appended claims.

What is claimed is:

1. A magnetic resonance gradient magnetometer comprising:
   a. first and second magnetic resonance cells rigidly mounted to a common base separated by a predetermined distance;
   b. a common pumping light source to provide a beam of pumping radiation;
   c. means to split the pumping beam from said common pumping source to provide a first pumping beam to said first cell and a second pumping beam to said second cell such that the light received by both said first and second cells is from the same region of said common pumping source whereby any lamp variations will be equally experienced at both cells;
   d. means to circularly polarize said first and second pumping beams;
   e. a common readout source of light providing a common read-out beam;
   f. means to split said common read-out beam into first and second read-out beams and to provide said first and second beams respectively to said first and second resonance cells so as to intersect said cells perpendicular to said first and second pumping beams such that the light received by both said first and second cells is from the same region of said common read-out source whereby any lamp variations will be equally experienced at both cells;
   g. means to cause said first and second read-out beams to interact with said cells so as to provide an amplitude modulated signal;
   h. first and second means to detect and provide an output proportional to the intensity of said respective first and second read-out beams after passing through said first and second cells;
   i. a first set of $H_1$ coils with the axis of said coil parallel to said first read-out beam;
   j. a second set of $H_1$ coils with the axis of said coils parallel to said second read-out beam;
   k. first coil driving means to drive said first set of coils, said means being responsive to the output of said first detecting means;
   l. second coil driving means to drive said second set of coils, said means being responsive to the output of said second detecting means; and
   m. phase comparator means having the output of said first and second detecting means as inputs and providing an output function dependent on the phase difference of said inputs whereby said output will be functionally dependent on the difference between the magnitudes of the earths magnetic field at said first and second cells.

2. The invention according to claim 1 and further including first and second pickup coils adjacent said driving coils the outputs of said coils providing further inputs to the respective one of said first and second coil driving means.

3. The invention according to claim 1 and further including a $H_o$ bias coil arranged to bias the earth's field at said first cell said bias coil being coupled to the output of said phase comparator means.

4. The invention according to claim 3 wherein said bias coil is directly coupled to the output of said phase comparator means.

5. The invention according to claim 3 wherein said bias coil is coupled to said phase comparator means through a low pass filter.

6. The invention according to claim 3 and further including second and third $H_o$ bias coils operable respectively to bias the earth's field by an equal amount at said first and second cells to thereby change the spin frequency and means to drive said coils.

7. The invention according to claim 3 and further including:
   a. a second $H_o$ bias coil operable to bias the earth's field at said second cell;
   b. a reference oscillator; and
   c. a second phase comparator having as inputs the output of said reference oscillator and the output of said second detecting means and providing its output to said second bias coil thereby causing said second cell to operate at the frequency of said reference oscillator.

8. The invention according to claim 3 and further including:
   a. a second $H_o$ bias coil operable to bias the earth's field at second cell;
   b. a third $H_o$ bias coil operable to bias the earth's field at said first coil;
   c. a reference oscillator;
   d. a second phase comparator having as inputs the outputs of said reference oscillator and said second detector means providing its output to said second and third $H_o$ bias coils; and e. wherein said first phase detector obtains its inputs from said reference oscillator and said first detector means.

9. The invention according to claim 3 and further including an optical bandpass filter interposed in the path of the radiation from said pumping source.

10. The invention according to claim 9 and further including a variable attenuator in the path of at least one of said first and second pumping beams to provide means for balancing beam intensity.

11. The invention according to claim 10 and further including an optical filter interposed in the path of said readout beam from said common readout source.

12. The invention according to claim 11 and wherein said means to cause said beams to interact includes means to polarize said first and second readout beams.

13. The invention according to claim 12 wherein said polarizing means comprises means to circularly polarize said beams.

14. The invention according to claim 12 wherein said means to polarize comprise means to linearly polarize and further including a linear analyzer interposed between each of said first and second cells and said first and second detecting means.

15. The invention according to claim 14 wherein the means to split said readout beam includes means to linearly polarize said first and second readout beams.

16. The invention according to claim 15 wherein said means to split comprises a Brewster angle polarizer.

17. The invention according to claim 16 wherein said means to split said pumping beam comprises a Brewster angle polarizer and said means to circularly polarize said first and second readout beams comprise first and second quarter wave plates.

* * * * *